United States Patent [19]

Stalder et al.

[11] Patent Number: 4,546,788
[45] Date of Patent: Oct. 15, 1985

[54] SLIDE VALVE CONSTRUCTION

[75] Inventors: Hans Stalder; Hans Sidler, both of Eschenbach, Switzerland

[73] Assignee: Sistag, Maschinenfabrik Sidler AG, Switzerland

[21] Appl. No.: 369,233

[22] Filed: Apr. 16, 1982

[30] Foreign Application Priority Data

Oct. 29, 1981 [CH] Switzerland .................. 6908/81

[51] Int. Cl.⁴ .............................................. F16K 3/30
[52] U.S. Cl. ..................................... 137/242; 137/244
[58] Field of Search ................ 137/244, 242; 251/326, 251/328; 406/130

[56] References Cited

U.S. PATENT DOCUMENTS

| 2,982,295 | 5/1961 | Williams | 137/242 |
| 2,982,513 | 5/1961 | Krummel | 137/244 |
| 4,356,838 | 11/1982 | Morello | 137/242 |

FOREIGN PATENT DOCUMENTS 597429  5/1960  Canada ................................. 137/242

Primary Examiner—Martin P. Schwadron
Assistant Examiner—John S. Starsiak, Jr.
Attorney, Agent, or Firm—McGlew and Tuttle

[57] ABSTRACT

A slide valve comprises a valve housing which has a through passage therein with a curved bottom and a recess along the bottom in which is located a resilient seal member. The valve member includes a slide portion which is mounted for upward and downward reciprocal movement in the housing and a guideway formed on each side of the curved bottom. The housing also contains a flange member on each side of the slide plate which has at least one notched portion which defines a scraper edge. The valve plate has a lower stepped portion forming a bottom projecting surface, an upper surface spaced away from the bottom edge and an intermediate ledge surface between the bottom and upper surfaces. The upper surface is curved downwardly at each side toward the bottom surface to define a shearing edge on each side of the slide plate which is cooperable with the scraper edge to dislodge material out of the guideway and the space between the flanges and into the flow stream of the through passage of the valve.

6 Claims, 7 Drawing Figures

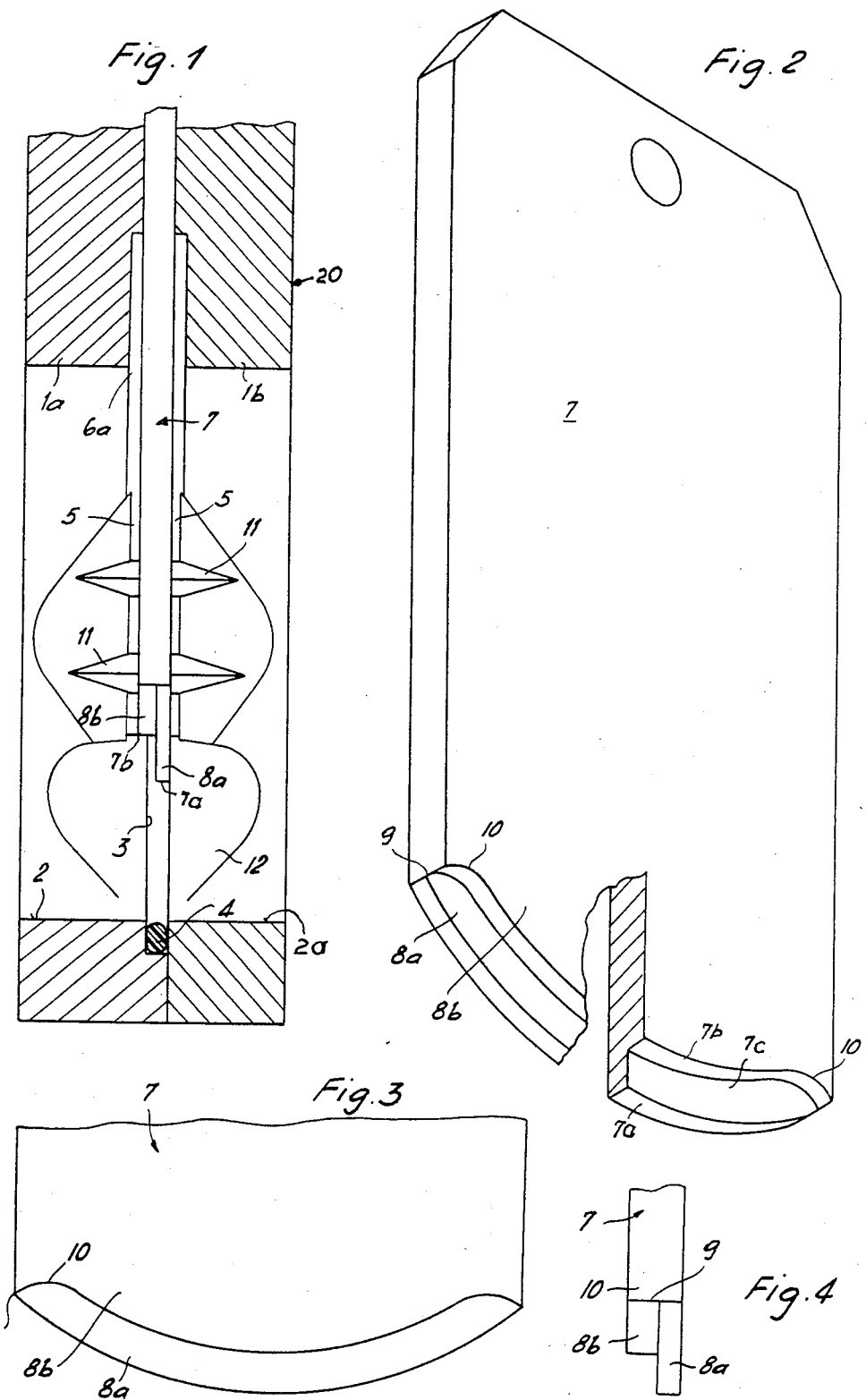

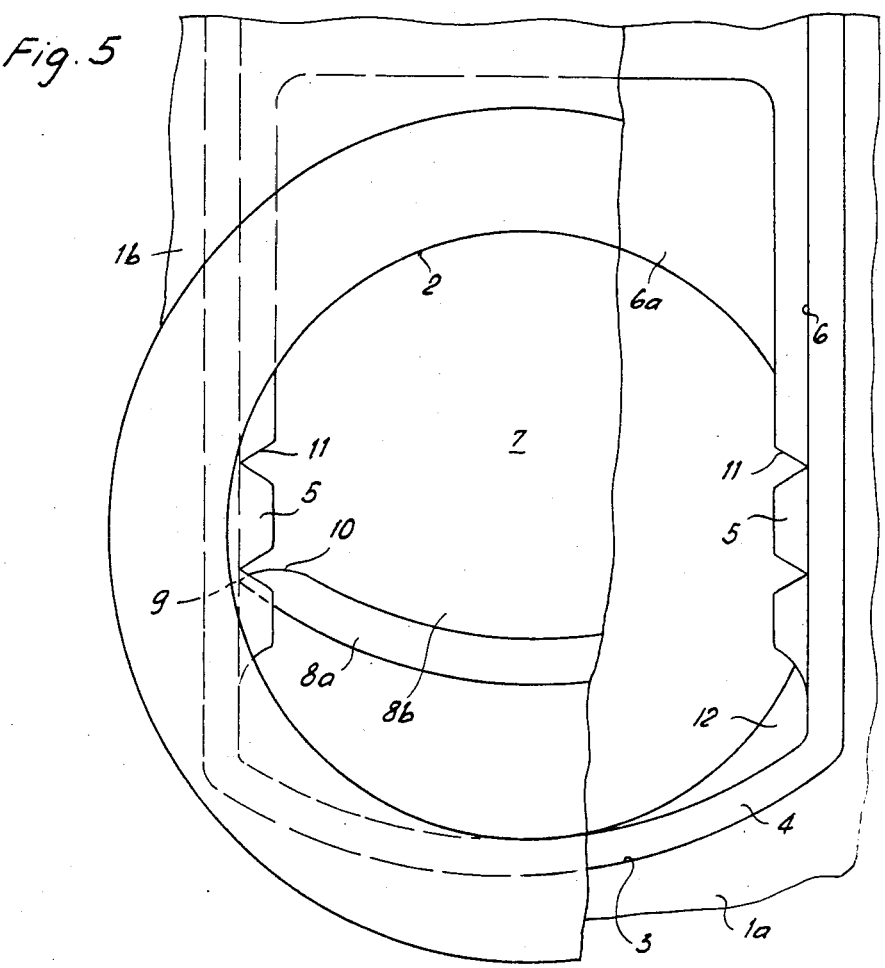
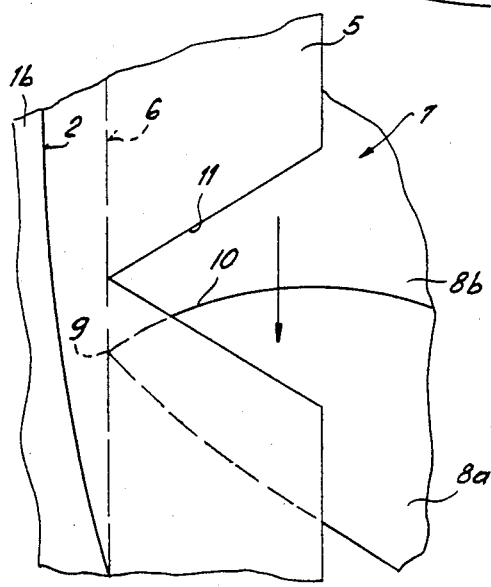

SLIDE VALVE CONSTRUCTION

FIELD AND BACKGROUND OF THE INVENTION

This invention relates in general to valve construction and in particular to a new and useful slide valve particularly for use with granular and pulverulent substances.

The present invention relates to slide valves having flat valve plates particularly slide valves intended for shutting off pipes for conveying pulverulent or granular substances, and of the kind comprising a housing which contains a passageway for traversal by the substance to be conveyed, and a gaplike guide or guide recess for the valve plate, which guide is centrally situated in the housing and enclosed thereby, the slide valve cooperating with a seal outwardly closing off the guide recess in its blocking position. Herinafter such slide valves will be referred to as "of the kind described".

It is known that difficulties may arise during application of flat slide valves of the kind described in pipes which duct dust-like, granular and pulverulent substances. These difficulties manifest themselves in that particles of a substance may collect in the plate guides and that difficulties then arise primarily during the shutting operation. These difficulties predominantly consist in jamming of the slide valve plate since these trapped particles are denied any path for ejection into the flow. On the other hand, it will be apparent, particularly in the case of sharp-edged particles such as sand, that the slide valve plate slides badly in the area of the housing guide, because these particles stick between the plate and the housing and thereby impede the displacement of the valve plate.

SUMMARY OF THE INVENTION

The invention provides a slide valve of the kind described, in which these difficulties are minimized or avoided.

The invention comprises a slide valve of the kind described, wherein the width of the lower edge of the slide valve plate in the position of use, is reduced in a stepped form in the direction of the plate thickness. A projecting portion of the valve is convexly curved whereas a set-back portion, having a central contour similar to that of the projecting portion, terminates in a narrow-slide transitional between the convexly curved edge portion and the narrow sides of the plate. The set-back portion forms shearing edges. The passageway has a circular cross-section and pairs of flanges delimit a gap-like guide or guide recess and project into the passageway. The passageway has at least one notch with an inner edge which acts as a scraper edge in cooperation with the shearing edges of the slide valve plate.

Due to this construction, the material present in the plate guides in particle form is pushed downwardly by the outer edge of the projecting edge portion of the plate and by the outer part of the shearing edges of the set-back portion and is scraped off by a shearing action in the area of the notches and ejected into the passageway. Jamming of the slide valve plate within the gaplike guide which is usually quite narrow, may thereby be minimized or even entirely avoided.

Accordingly it is an object of the invention to provide a slide valve which includes a slide plate movable across a flow passage for controlling flow therethrough and which cooperates with flange elements on each side of the passage which have a notch portion which act together with portions of the valve to remove solid substances from the valve slide plate guideway.

A further object of the invention is to provide a slide valve which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a partial transverse sectional view of a slide valve constructed in accordance with the invention;

FIG. 2 is a perspective view partly in section of the slide valve plate;

FIG. 3 is a partial front elevational view of the slide valve plate;

FIG. 4 is a partial end elevational view of the slide valve plate;

FIG. 5 is a partial front view and partially broken away view of the slide valve shown in FIG. 1;

FIG. 6 is a large detailed view of the slide valve shown in FIG. 5; and

DESCRIPTION OF THE PREFERRED EMBODIMENT

Figure 7:
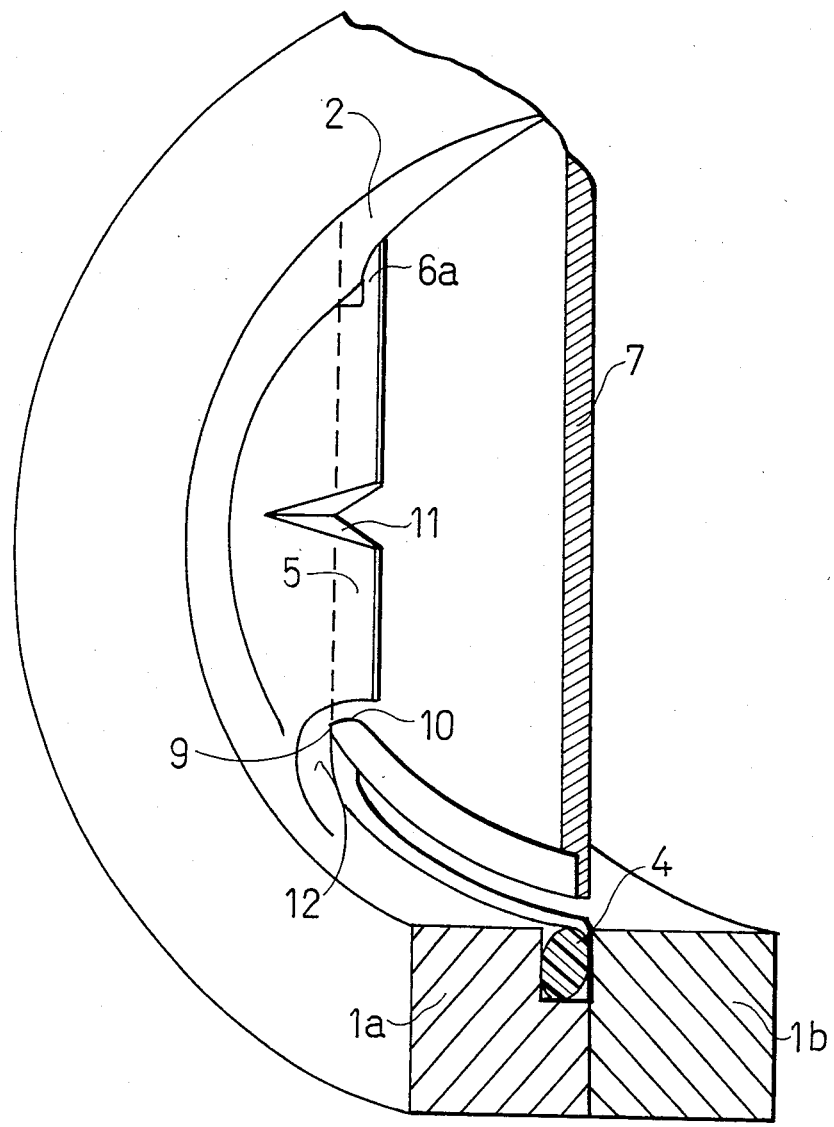
FIG. 7 is a perspective view partly in section of the valve plate in the slide valve just above the closed position of the valve.

Referring to the drawings in particular the invention embodied therein comprises a valve housing generally designated 20 which in the embodiment shown is made up of two housing portions 1a and 1b. The housing defines a through passage 2 for the flow of material therethrough which includes a curved bottom portion having a recess 3 in which is positioned a seal member 4. A valve member for the housing 7 includes a spindle portion (not shown) which is mounted for reciprocation in the housing and a slide valve plate 7 connected to the spindle, which is adapted to move across the flow passage 2 to close the passage. The housing also includes flange means 5,5 disposed along each side of the slide valve plate 7 which has at least one notch portion 11 (in this instance there are two notch portions 11) which defines a scraper edge.

In accordance with the invention the slide valve plate includes the lower step portion forming a bottom projecting surface 7a, an upper surface 7b spaced away from the bottom surface 7a and an intermediate surface 7c formed between the bottom and upper surface. The upper surface 7b is curved at each side in a direction downwardly toward the lower surface 7a and defines a shearing edge 10 on each side of the slide valve plate 7 which cooperates with the scraper edge 11 to dislodge material out of the guided path of the slide valve plate.

Referring now to the drawings, 1a and 1b are the two housing sections which are firmly joined together in any desired manner (not illustrated), of a flat slide valve such as generally described in the Swiss Pat. No. 614,764, for example. The recess 3 flanks a passageway 2 of the slide valve housing, wherein the seal 4 is inserted in conventional manner, and is situated in the junction surface of the housing section 1a bearing against the housing section 1b. Furthermore, a valve guideway or guide recess 6 which has a gap enlargement 6a above the passageway 2, is formed in the area of the passageway 2 by means of the lateral pairs of flanges 5.

The slide valve plate 7 which is provided with the operating spindle at its upper end projecting out of the housing is guided in a vertically displaceable manner in the guide recess 6 present at both sides. The width of the lower edge of this slide valve plate 7 is reduced in step-like form in the direction of its thickness. A projecting portion 8a of the valve plate 7 which carries surfaces 7a and 7b is convexly curved in an arcuate manner, the diameter of the arc being greater than the plate width, so that the narrow external or bottom surface 7a of this portion 8a which is intended to cooperate with the correspondingly shaped lower part of the seal 4, merges into the mutually parallel sides of the slide valve plate 7 while forming a transverse edge 9. Concave shearing edges 10 of a set-back or step portion 8b of the slide valve plate 7 terminate at this transverse edge, the central part of the portion 8b being convexly curved similarly to the convexly curved projecting edge portion 8a to form the upper surface 7b and edges 10.

As will be seen from FIGS. 1, 5 and 6, the parts of the pairs of flanges 5 forming the guide recess 6 at either side which lie in the area of the passageway 2, are each provided with two notches 11 having a triangular cross-section and extending as far as the base of the guide recess 6. Depending on the size of the slide valve, it is evidently possible to provide one only or more than two such notches 11. These notches 11 are thus laterally open toward the passageway 2, but cannot impair the guiding action on the slide valve plate 7.

When a slide valve is fitted in a pipe, for example for conveying dust-like or pulverulent material, and is in the open position, particles of such material may accumulate within the guide recess 6. Due to the enlargement 6a of the guide recess 6 formed above the passageway 2, material penetrating thereinto cannot normally cause jamming of the slide valve plate 7 when the latter is displaced downwardly for the purpose of closing the slide valve. Matters are different in the area of the comparatively narrow guide recess 6 formed by the pairs of flanges 5. Due to the specified configuration of the lower portions 8a, 8b of the valve plate 7, material present in particle form in the guide recess 6 is pushed by the sharp edged portion 8a, and by the equally sharp shearing edge 10 of the portion 8b, into the area of the notches 11 and is scraped off thereat by shearing action caused by cooperation of the edges 10 and step portion 8b with inner bottom edges of the notches 11.

The material which is carried laterally into the notches 11 and out of the guide recess 6 to return into the area of the throughflow passage 2, is thus swept away again by the flow of material through the passage. It is evident that this action also occurs if the substance conveyed is a fluid containing solids. Immediately before the slide valve plate 7 reaches its bottom closing position, the material particles are downwardly ejected thereby from the guide recess 6 and are entrained by the still present flow of material in areas of so-called scavenging apertures 12 (FIGS. 1 and 5), since the pairs of flanges 5 forming the guide recess 6 and possibly acting as obstacles to the flow, terminate in these areas. Substantially perfect sliding of the slide valve plate 7 in the guide recess 6 is thus assured at all times.

As best shown in FIG. 7, the scavenging aperture 12 is formed below the flange 5. Near the top of the flange 5, the gap enlargement 6a is formed. This is immediately adjacent the guide recess 6 (not shown in FIG. 7) which receives the edge area of the plate 7. FIG. 7 also shows the position of shearing edge 10 which is adjacent the transverse edge 9.

While a specific embodiment of the invention has been shown and described in detail to illustrate the application of the principles of the invention, it will be understood that the invention may be embodied otherwise without departing from such principles.

What is claimed is:

1. A slide valve comprising a valve housing having a through passage with a curved bottom and a valve guideway on each side of said bottom, a valve member mounted for reciprocable movement in said housing including a slide valve plate movable across the passage to close the passage, flange means in said housing disposed along sides of said plate and having at least one notch portion defining a scraper edge adjacent said valve plate, said valve plate having a lower step portion followed by a bottom projecting portion, said bottom portion having a bottom surface, said step portion having an upper surface spaced upwardly from said bottom surface and said bottom portion having an intermediate surface between said bottom and upper surfaces, said upper surface being curved downwardly at each side toward said bottom surface to define a shearing edge on each side of said valve plate cooperable with said scraper edge to dislodge material away from said slide valve plate.

2. A slide valve according to claim 1, wherein said housing has a guideway on each side of said valve which enlarges said housing above said passageway.

3. A slide valve according to claim 1, wherein said flange means defines a plurality of notches having triangular cross sections and sharp inner edges.

4. A slide valve according to claim 1, wherein said shearing edge have concavely curved undersides.

5. A slide valve according to claim 1, wherein said flange means includes a flange on each side of said slide valve plate, each of said flanges having two notches spaced apart, said housing having a guideway on each side of said housing flow passage for said valve extending from the interior of said housing into said passage.

6. A slide valve according to claim 1, wherein said upper and bottom surfaces end at an outer transverse edge at each side of said valve plate which is sharp, each shearing edge also being sharp.

* * * * *

UNITED STATES PATENT AND TRADEMARK OFFICE
CERTIFICATE OF CORRECTION

PATENT NO. : 4,546,788
DATED : October 15, 1985
INVENTOR(S) : Hans Stalder et al It is certified that error appears in the above-identified patent and that said Letters Patent is hereby corrected as shown below:

On the title page assignee should read:

--(73) Assignee: Slide Valve Construction
Sistag, Maschinenfabrik Sidler Stalder AG
Eschenbach, Switzerland --.

Signed and Sealed this

Tenth Day of June 1986

[SEAL]

Attest:

DONALD J. QUIGG

Attesting Officer

Commissioner of Patents and Trademarks